(12) United States Patent
Izoe

(10) Patent No.: US 8,840,215 B2
(45) Date of Patent: Sep. 23, 2014

(54) PRINTING DEVICE SETTING BIASED CONVEYING DISTANCE BY INCREASING OR DECREASING PRESCRIBED DISTANCE AS TARGET CONVEYING DISTANCE

(75) Inventor: Shintaro Izoe, Kiyosu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 121 days.

(21) Appl. No.: 13/434,762

(22) Filed: Mar. 29, 2012

(65) Prior Publication Data

US 2013/0002760 A1   Jan. 3, 2013

(30) Foreign Application Priority Data

Jun. 30, 2011   (JP) .................................. 2011-145622

(51) Int. Cl.
*B41J 29/38* (2006.01)
*G06K 15/10* (2006.01)

(52) U.S. Cl.
CPC .................................... *G06K 15/105* (2013.01)
USPC .......................................................... 347/16

(58) Field of Classification Search
CPC ....................................................... B41J 11/42
See application file for complete search history.

(56) References Cited

U.S. PATENT DOCUMENTS

| | | |
|---|---|---|
| 5,079,563 A | 1/1992 | Starkweather et al. |
| 5,988,790 A | 11/1999 | Koike et al. |
| 6,250,734 B1 | 6/2001 | Otsuki |
| 6,260,946 B1 | 7/2001 | Hori |
| 6,595,619 B2 * | 7/2003 | Barinaga et al. ................. 347/32 |
| 6,744,530 B1 | 6/2004 | Someno et al. |
| 6,883,898 B2 | 4/2005 | Sato |
| 7,520,583 B2 | 4/2009 | Arazaki et al. |
| 7,988,251 B2 | 8/2011 | Dimitrijevic et al. |
| 2002/0063873 A1 * | 5/2002 | Kakutani et al. ............... 358/1.8 |
| 2004/0080551 A1 | 4/2004 | Nunokawa |
| 2008/0284808 A1 | 11/2008 | Kano et al. |

(Continued)

FOREIGN PATENT DOCUMENTS

| | | |
|---|---|---|
| JP | H09-277601 A | 10/1997 |
| JP | H11-207945 A | 8/1999 |

(Continued)

OTHER PUBLICATIONS

Machine translation of JP 2004-216615 A. (JP 2004-216615 A was published on Aug. 5, 2004.).*

(Continued)

*Primary Examiner* — Justin Seo
(74) *Attorney, Agent, or Firm* — Baker Botts L.L.P.

(57) ABSTRACT

In a printing device, the print control processor is configured to perform a print operation in a resolution in which a plurality of raster lines is arranged in a first direction by a line pitch smaller than the prescribed nozzle pitch by using a prescribed print method. The prescribed print method prints the plurality of raster lines arranged in the first direction in a prescribed order. The print control processor is configured to control a scanning portion to convey the recording sheet by a biased conveying distance as a target conveying distance. The biased conveying distance is set, depending on the prescribed print method, to be decreased or increased from a prescribed distance. The prescribed distance is an ideal value that achieves the resolution in which the plurality of raster lines is uniformly arranged in the first direction by the line pitch.

6 Claims, 10 Drawing Sheets

(56) References Cited

U.S. PATENT DOCUMENTS

| | | |
|---|---|---|
| 2008/0298827 A1 | 12/2008 | Akiyama et al. |
| 2010/0165032 A1 | 7/2010 | Yoshida |
| 2013/0002745 A1 | 1/2013 | Izoe |
| 2013/0003082 A1 | 1/2013 | Izoe |

FOREIGN PATENT DOCUMENTS

| | | |
|---|---|---|
| JP | H11-286102 A | 10/1999 |
| JP | 2003-226002 A | 8/2003 |
| JP | 2004-216615 A | 8/2004 |
| JP | 2005-349638 A | 12/2005 |

OTHER PUBLICATIONS

Translation of JP 2004-216615 A. (JP 2004-216615 A was published on Aug. 5, 2004.).*

* cited by examiner

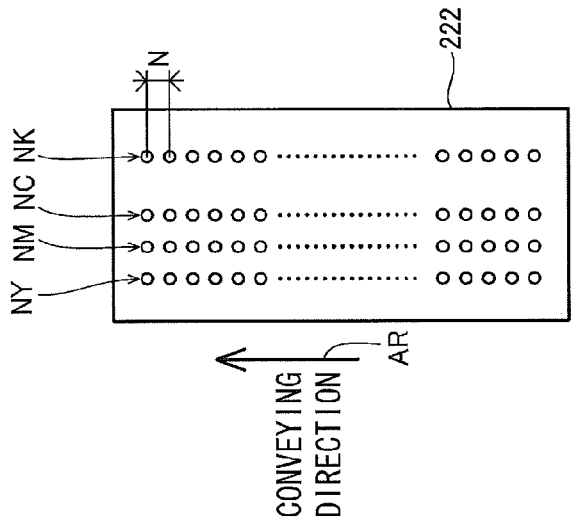
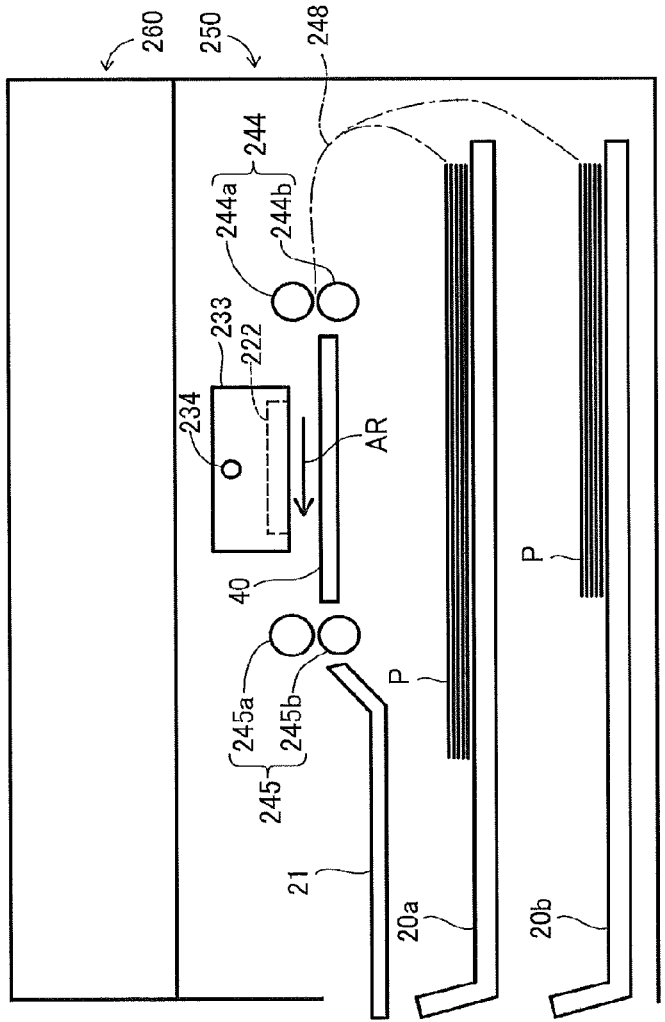
FIG. 2(a)
FIG. 2(b)

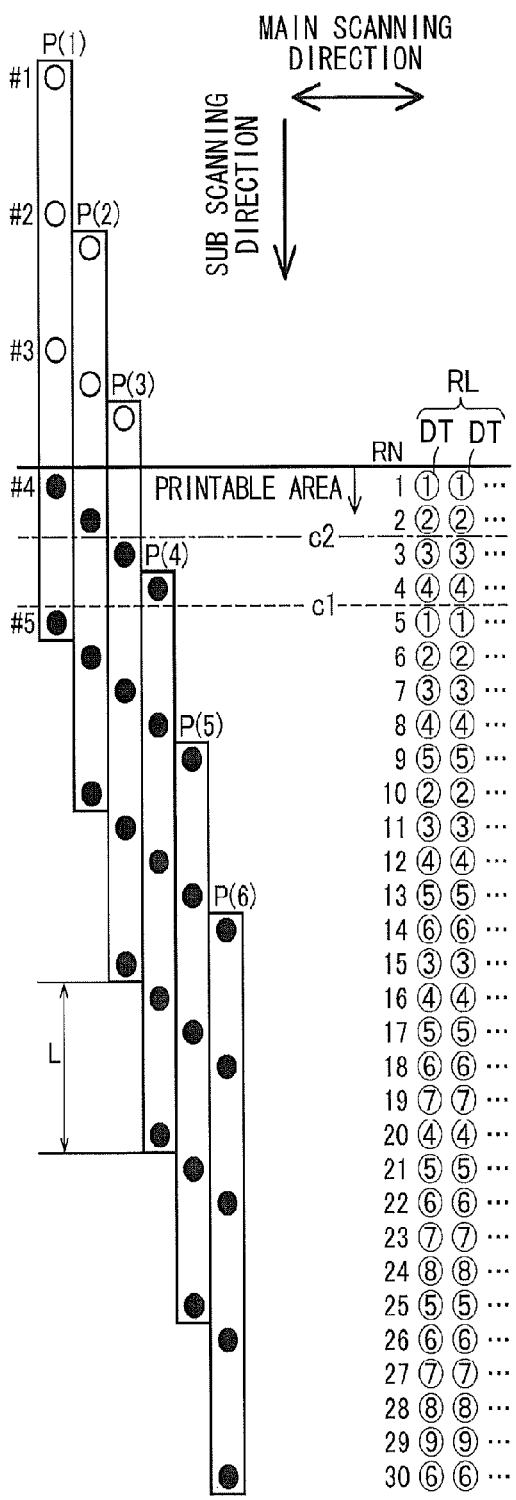
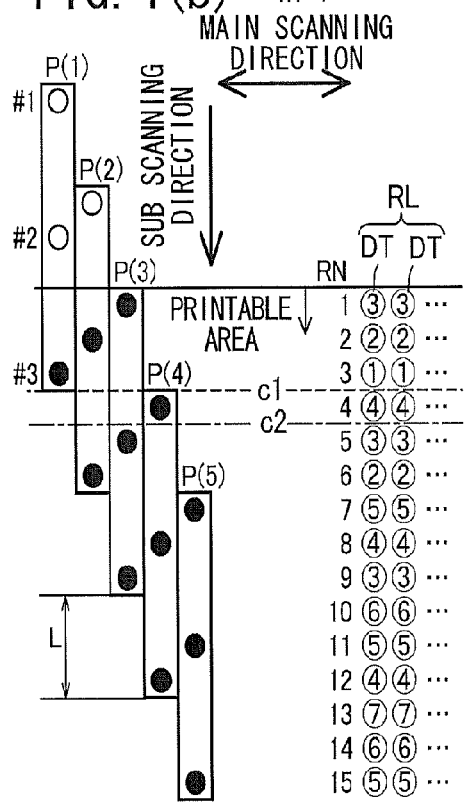
FIG. 4(a) 4n+1
FIG. 4(b) 4n−1

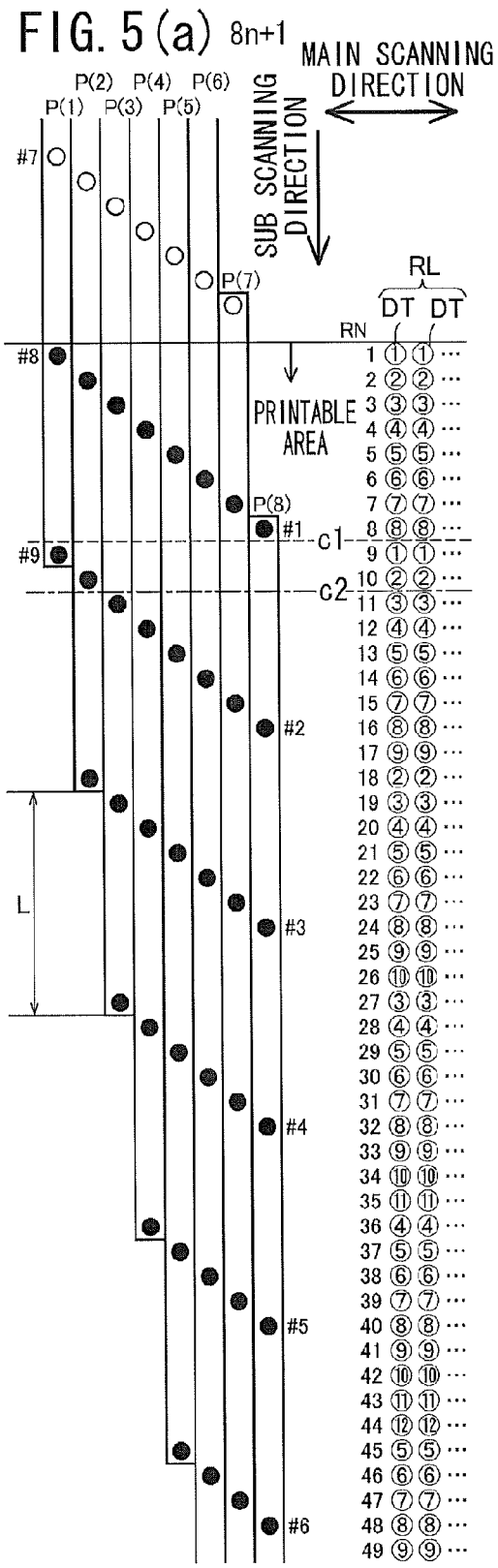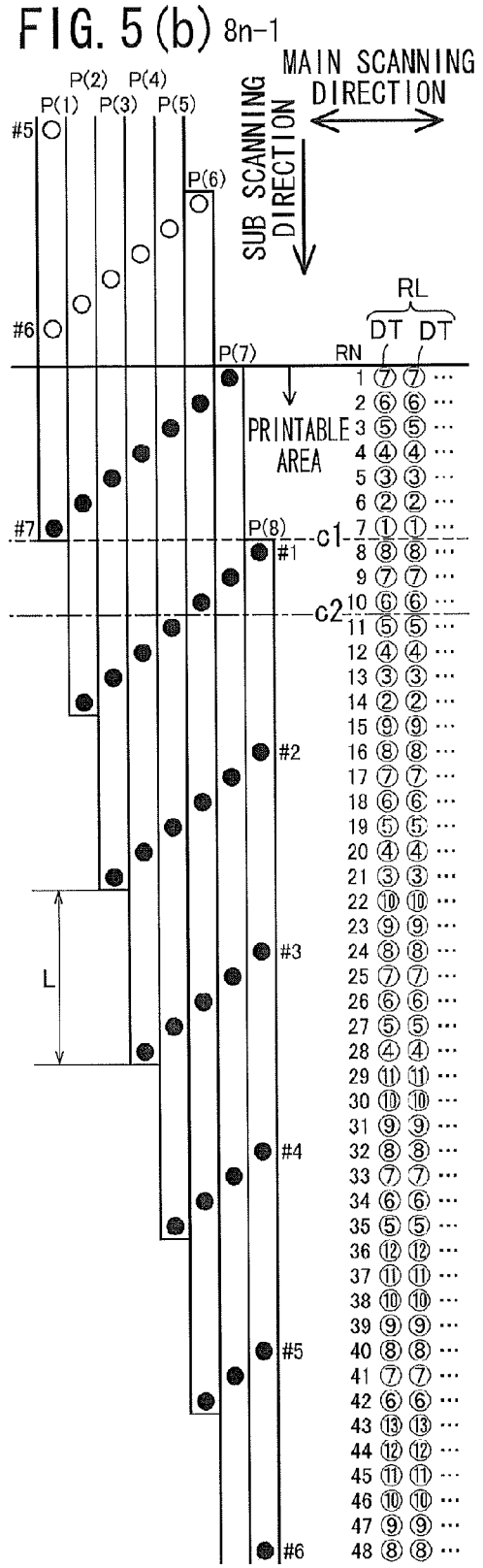

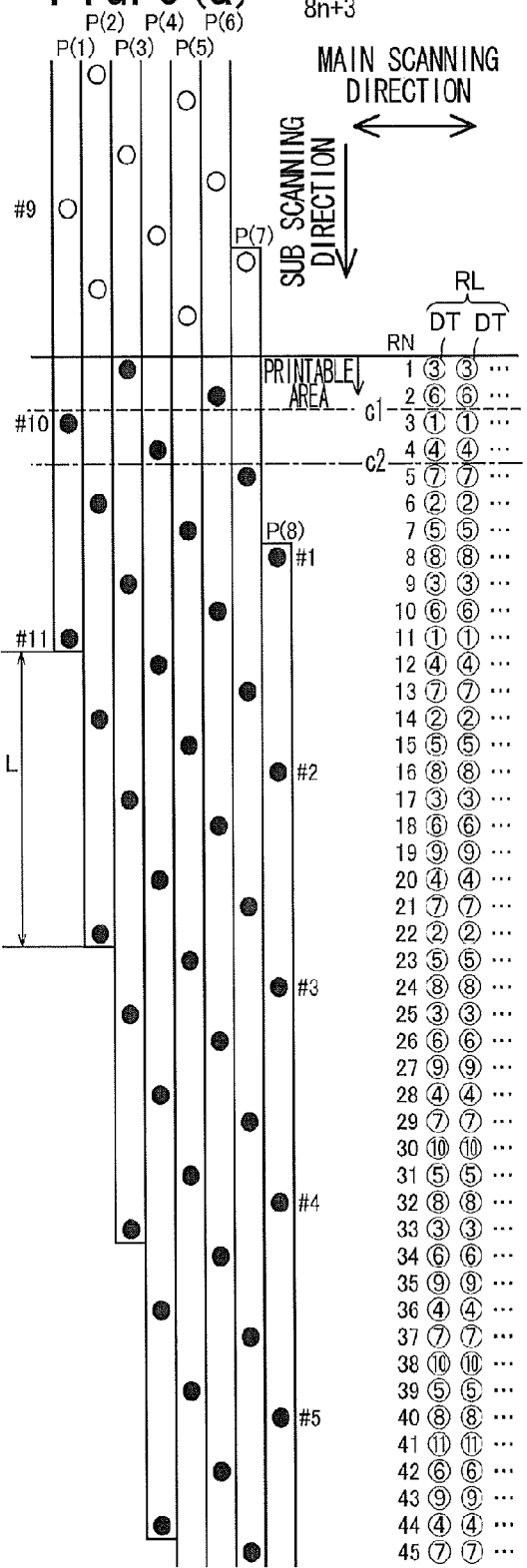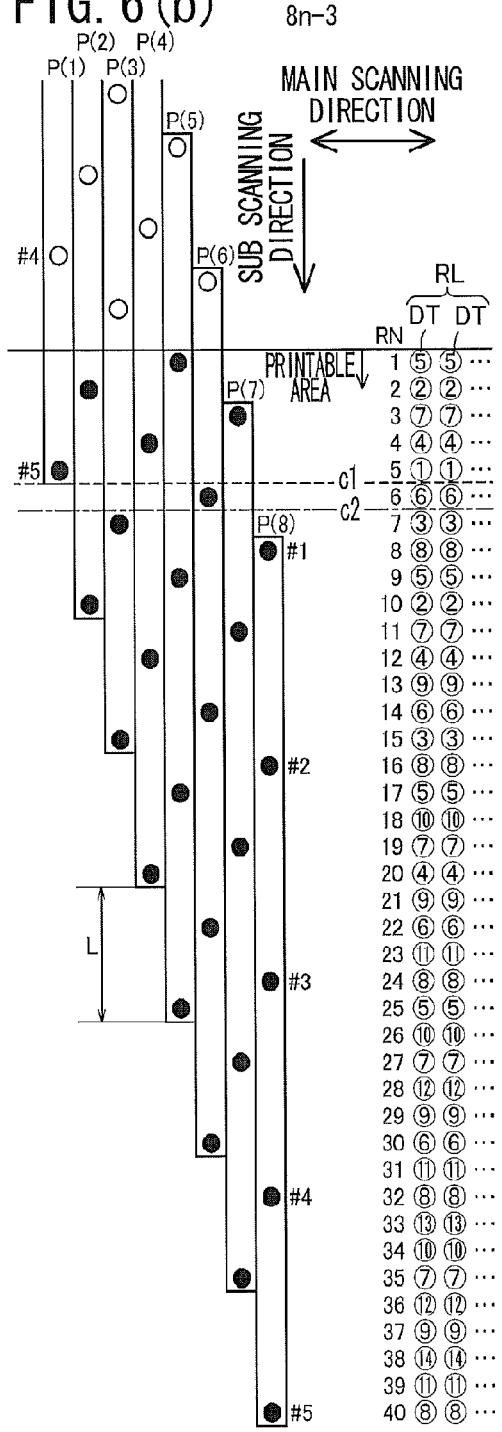
FIG. 6(a)
FIG. 6(b)

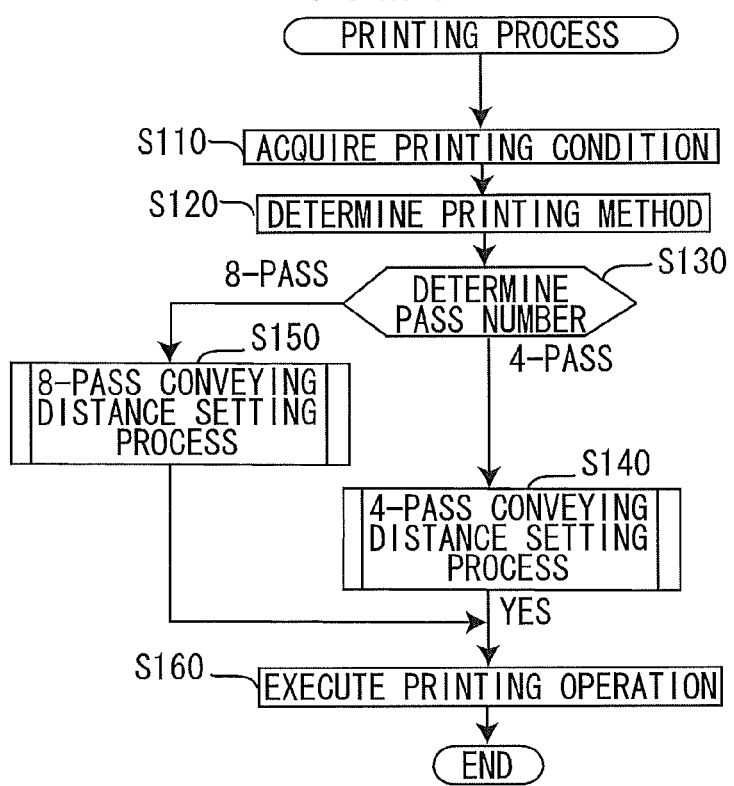

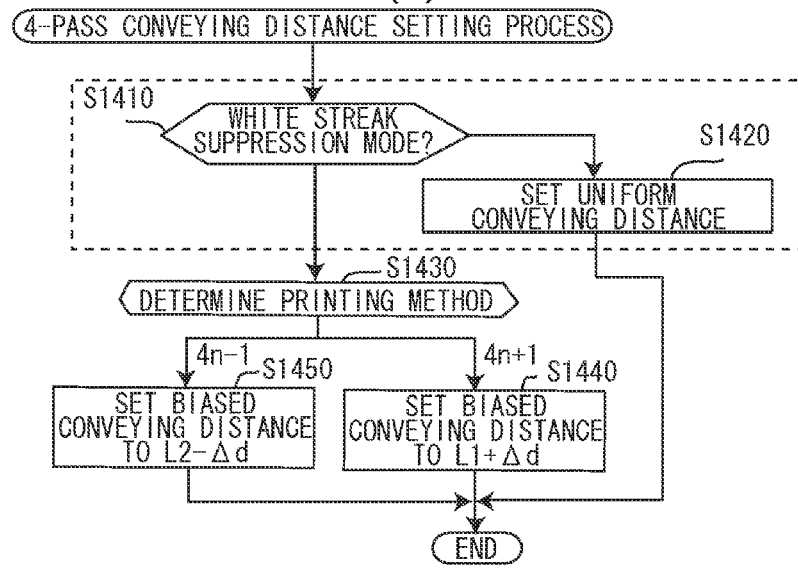
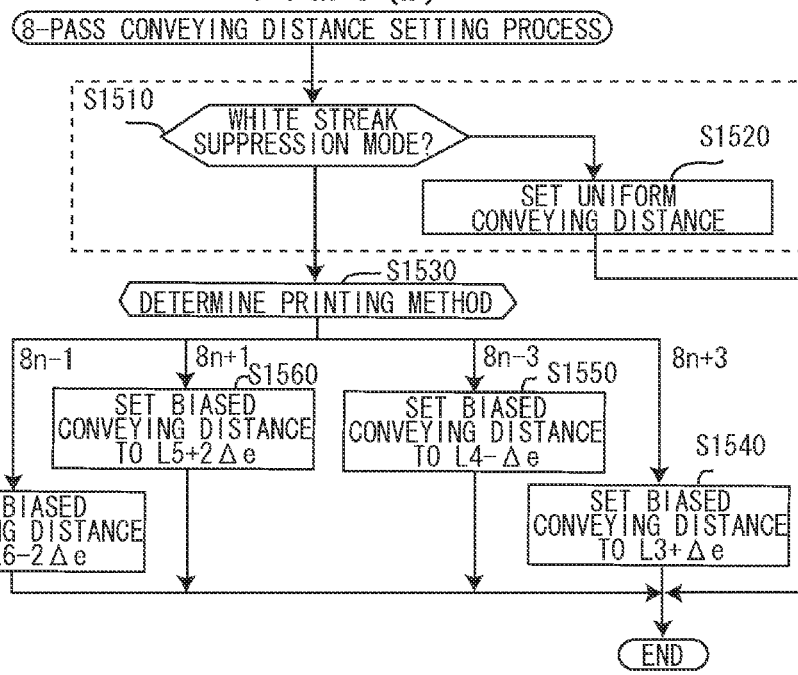

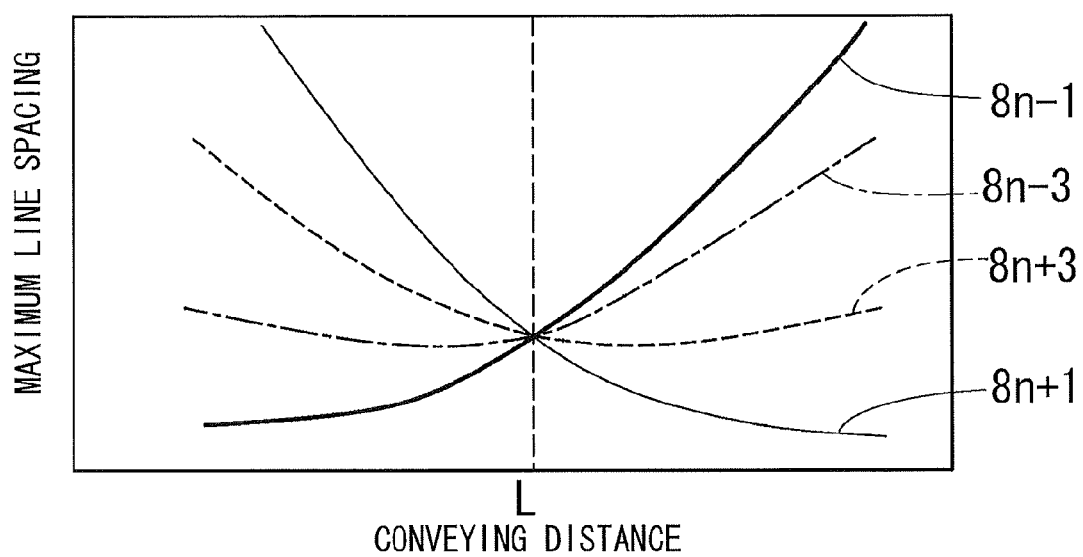

PRINTING DEVICE SETTING BIASED CONVEYING DISTANCE BY INCREASING OR DECREASING PRESCRIBED DISTANCE AS TARGET CONVEYING DISTANCE

CROSS REFERENCE TO RELATED APPLICATION

This application claims priority from Japanese Patent Application No. 2011-145622 filed Jun. 30, 2011. The entire content of the priority application is incorporated herein by reference.

TECHNICAL FIELD

The invention relates to a printing device capable of reducing defects in images formed through interlaced printing.

BACKGROUND

Printing devices that print images by forming dots on a print medium are in widespread use. Some such printing devices employ an interlaced printing method known in the art in which dots are formed on adjacent main scanning lines in different main scans. Using interlaced printing, a printing device can print at a higher resolution, whereby the pitch of dots in the sub-scanning direction (the line spacing of adjacent main scanning lines) is smaller than the nozzle pitch in the sub-scanning direction.

A printer possessing a printing technology known in the art prints a prescribed pattern having a plurality of main scan lines that include a reference main scan line, measures the amounts of offsets between the reference main scan line and the non-reference main scan lines in the printed pattern, and calibrates a conveyance control amount for conveying the paper based on the measured offset. This technology calibrates the conveyance control amount so that the actual paper-conveying distance is adjusted to the ideal conveying distance for each of various printing modes that differ according to their method of interlaced printing.

SUMMARY

However, since error occurs in the actual conveying distance, even when paper is conveyed by the same conveyance control amount, the actual conveying distances differ each time the paper is conveyed and, hence, do not achieve the ideal conveying distance. Therefore, even when paper is conveyed according to the calibrated conveyance control amount, there is a possibility that the conventional printer cannot suppress a decline in image quality caused by error in the conveying distance. This type of issue is not restricted to printing devices that convey paper, but is common to printing devices that scans a print head so that the print head moves relative to a print medium in a direction orthogonal to the raster lines.

The primary advantage of the invention is the ability to provide an interlaced printing technology capable of suppressing a decline in image quality caused by error in the conveying distance of a scan.

In order to attain the above and other objects, the invention provides a printing device. The printing device includes a print head, a scanning portion, a head drive portion, and a print control processor. The print head includes a plurality of nozzles arranged in a first direction and spaced apart by a prescribed nozzle pitch. The plurality of nozzles is configured to form dots having a same color on a recording sheet. The scanning portion is configured to perform a scan in which the scanning portion moves the print head relative to the recording sheet in the first direction. The head drive portion is configured to drive at least one nozzle of the plurality of nozzles to form dots such that a raster line configured of the dots extends in a second direction different from the first direction. The print control processor is configured to perform a print operation in a resolution in which a plurality of raster lines is arranged in the first direction by a line pitch smaller than the prescribed nozzle pitch by using a prescribed print method and by controlling the print head, the scanning portion, and the head drive portion. The prescribed print method prints the plurality of raster lines arranged in the first direction in a prescribed order. The print control processor is configured to control the scanning portion to convey the recording sheet by a biased conveying distance as a target conveying distance. The biased conveying distance is set, depending on the prescribed print method, to be decreased or increased from a prescribed distance. The prescribed distance is an ideal value that achieves the resolution in which the plurality of raster lines is uniformly arranged in the first direction by the line pitch.

According to another aspect, the invention provides a method for setting a printing device including: a print head including a plurality of nozzles arranged in a first direction and spaced apart by a prescribed nozzle pitch, and configured to form dots having a same color on a recording sheet; a scanning portion configured to perform a scan in which the scanning portion moves the print head relative to the recording sheet in the first direction; and a head drive portion configured to drive at least one nozzle of the plurality of nozzles to form dots such that a raster line configured of the dots extends in a second direction different from the first direction. The method includes: (a) determining a print method by which the plurality of raster lines is to be printed and arranged in the first direction in a prescribed order by a line pitch smaller than the prescribed nozzle pitch and to achieve a prescribed resolution, by using the print head, the scanning portion, and the head drive portion; and (b) setting, depending on the print method, a biased conveying distance such that the biased conveying distance decreases or increases from a prescribed distance, the prescribed distance being an ideal value that achieves the prescribed resolution in which the plurality of raster lines is uniformly arranged in the first direction by the nozzle pitch. The biased conveying distance is used as a target conveying distance in the print method.

According to another aspect, the invention provides a non-transitory computer readable storage medium storing a set of program instructions executed by a computer for controlling a printing device including: a print head including a plurality of nozzles arranged in a first direction and spaced apart by a prescribed nozzle pitch, and configured to form dots having a same color on a recording sheet; a scanning portion configured to perform a scan in which the scanning portion moves the print head relative to the recording sheet in the first direction; and a head drive portion configured to drive at least one nozzle of the plurality of nozzles to form dots such that a raster line configured of the dots extends in a second direction different from the first direction. The program instructions includes: (a) determining a print method by which the plurality of raster lines is to be printed and arranged in the first direction in a prescribed order by a line pitch smaller than the prescribed nozzle pitch and achieves a prescribed resolution, by using the print head, the scanning portion, and the head drive portion; and (b) setting, depending on the print method, a biased conveying distance used in the print method such that the biased conveying distance decreases or increases from a prescribed distance, the prescribed distance being an ideal value that achieves the prescribed resolution in which the plurality of raster lines is uniformly arranged in the first direction by the nozzle pitch. The biased conveying distance is used as a target conveying distance in the print method.

BRIEF DESCRIPTION OF THE DRAWINGS

In drawings:

FIG. 2(a) is a schematic diagram illustrating a structure of an overall inkjet printing unit;

FIG. 2(b) is a schematic diagram illustrating a structure of a print head when viewed from a bottom in FIG. 2(a);

FIG. 4(a) is an explanation diagram illustrating a 4n+1 printing method;

FIG. 4(b) is an explanation diagram illustrating a 4n−1 printing method;

FIG. 5(a) is an explanation diagram illustrating a 8n+1 printing method;

FIG. 5(b) is an explanation diagram illustrating a 8n−1 printing method;

FIG. 6(a) is an explanation diagram illustrating a 8n+3 printing method;

FIG. 6(b) is an explanation diagram illustrating a 8n−3;

FIG. 7 is a flowchart illustrating steps in a printing process;

FIG. 8(a) is a flowchart illustrating steps in a four-pass conveying distance setting process;

FIG. 8(b) is a flowchart illustrating steps in an eight-pass conveying distance setting process;

FIG. 9(a) is a graph when the 8n+3 printing method is used, FIG. 9(b) is a graph when the 8n+1 printing method is used, FIG. 9(c) is a graph when the 8n−3 printing method is used, and FIG. 9(d) is a graph when the 8n−1 printing method is used; and FIG. 10 is a graph showing results of simulating maximum line spacing values in printing operations performed using each of the eight-pass printing methods.

DETAILED DESCRIPTION

A. First Embodiment

A-1. Structure of a Printing Device

Figure 1:
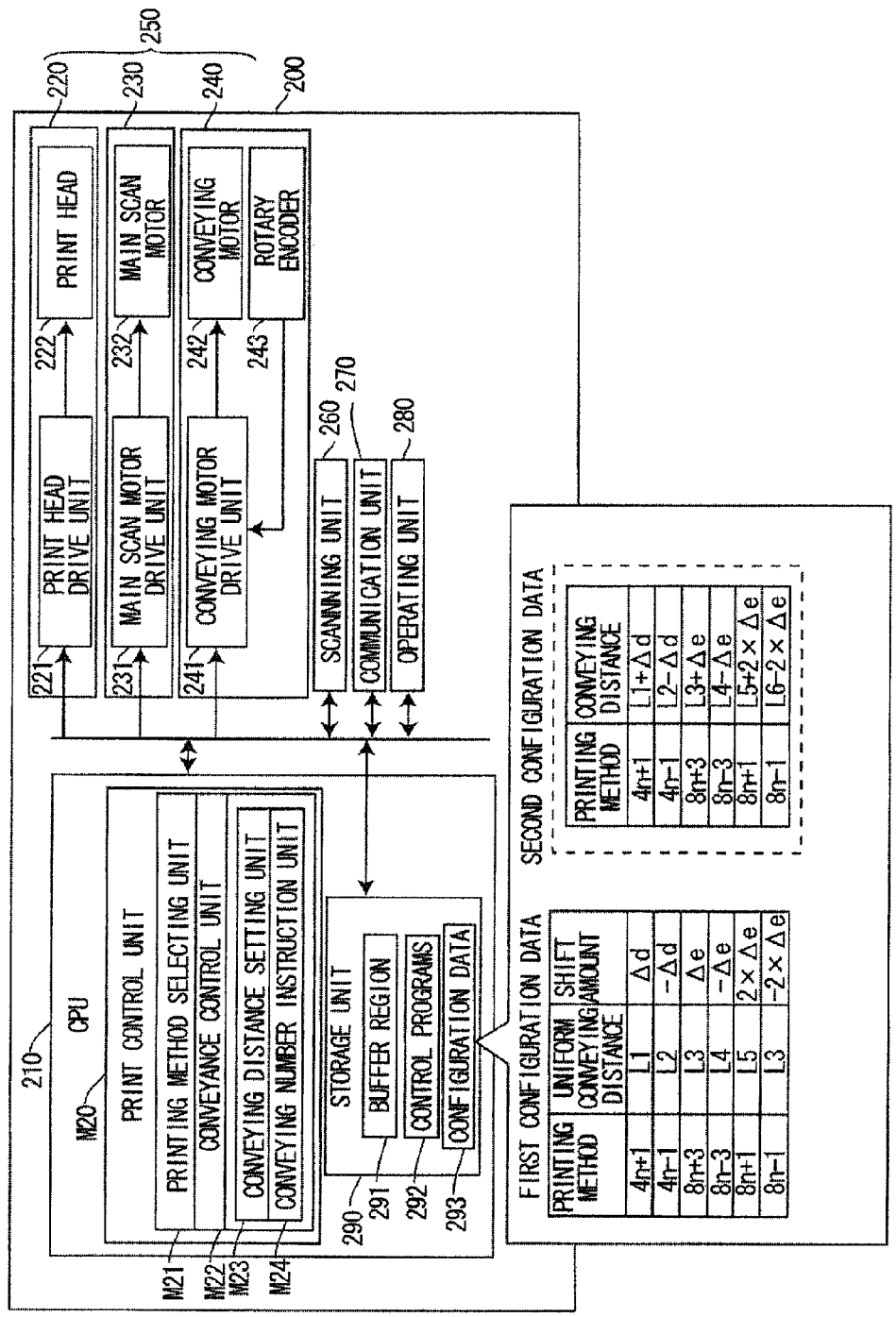
FIG. 1 is a block diagram showing a structures of a multi-function peripheral (MFP) according to an embodiment.

Next, an embodiment of the invention will be described. FIG. 1 is a block diagram showing the structures of a multi-function peripheral (MFP) 200 according to a first embodiment.

The MFP 200 includes a CPU 210, an inkjet printing unit 250; a flatbed scanning unit 260; a communication unit 270 provided with an interface for connecting to a personal computer or other type of computer, or an external storage device such as USB memory; an operating unit 280 having a control panel and various buttons; and a storage unit 290 including RAM, ROM, and a hard disk. The communication unit 270 can carry out data communications with the computer or the external storage device connected to the interface of the communication unit 270.

The storage unit 290 includes an allocated buffer region 291 and stores control programs 292, and configuration data 293. The configuration data 293 includes the content indicated as first configuration data in FIG. 1. As will be described later, the first configuration data stores a uniform conveying distance and a conveying distance shift amount for each of a plurality of interlaced printing methods. By executing the control programs 292, the CPU 210 functions as the control unit of the MFP 200. FIG. 1 selectively shows functional units relevant to the following description from among the functional units that make up the control unit of the MFP 200. The CPU 210 functions as a print control unit M20 for controlling the inkjet printing unit 250 to execute printing operations. The print control unit M20 includes a printing method selection unit M21 for selecting one of the plurality of printing methods to be used for a printing operation, and a conveyance control unit M22 for controlling a conveyance mechanism 240 (described later) of the inkjet printing unit 250 to convey a sheet of paper or other print medium. The conveyance control unit M22 further includes a conveying distance setting unit M23 for setting a biased conveying distance (described later) that differs according to the selected printing method, and a conveyance number instruction unit M24 for calculating a conveyance number (described later) corresponding to the specified conveying distance and instructing the conveyance mechanism 240.

The inkjet printing unit 250 performs printing operations by ejecting ink in the colors cyan (C), magenta (M), yellow (Y), and black (K). The inkjet printing unit 250 includes an ink ejection mechanism 220, a main scan mechanism 230, and a conveyance mechanism 240. The conveyance mechanism 240 includes a conveying motor 242, a conveying motor drive unit 241 for driving the conveying motor 242, and a rotary encoder 243. The conveyance mechanism 240 functions to convey a recording medium using the drive force of the conveying motor 242. The ink ejection mechanism 220 includes a print head 222 having a plurality of nozzles (described later), and a print head drive unit 221 for driving at least a portion of the nozzles. The ink ejection mechanism 220 forms images on a recording medium by ejecting ink droplets from the nozzles while the conveyance mechanism 240 conveys the recording medium. The main scan mechanism 230 includes a main scan motor 232, and a main scan motor drive unit 231 for driving the main scan motor 232. The main scan mechanism 230 reciprocates the print head 222 in a main scanning direction (movement in one direction being a main scan) using the drive force of the main scan motor 232.

FIG. 2(a) illustrates the structure of the overall inkjet printing unit 250, while FIG. 2(b) shows the structure of the print head 222 when viewed from the bottom in FIG. 2(a). As shown in FIG. 2(a), the inkjet printing unit 250 further includes paper trays 20a and 20b for accommodating paper P serving as the recording medium, a discharge tray 21 for receiving the sheets of paper P discharged from the MFP 200 after being printed, and a platen 40 disposed to confront the surface of the print head 222 from which ink is ejected.

The conveyance mechanism 240 conveys sheets of paper P along a conveying path extending from the paper trays 20a and 20b, over the platen 40, and to the discharge tray 21. An arrow AR in FIG. 2 indicates the direction in which the paper P is conveyed over the platen 40. Hereinafter, the direction in which the paper P is conveyed over the platen 40 will be referred to as a "conveying direction AR." By conveying the paper P over the platen 40 in the conveying direction AR, the print head 222 moves opposite the conveying direction AR relative to the paper P. The direction opposite the conveying direction AR is referred to as the "sub-scanning direction," and a "sub scan" is the act of moving the print head 222 relative to the paper P or other recording medium in the sub-scanning direction. Further, the side of an object in the direction opposite a prescribed direction will be referred to as the "upstream side" of the prescribed direction, while the side in the prescribed direction will be referred to as the "downstream side" of the prescribed direction.

The conveyance mechanism 240 further includes an upstream clamping unit 244 disposed on the upstream side of the platen 40 relative to the conveying direction AR, a downstream clamping unit 245 disposed on the downstream side of the platen 40 in the conveying direction AR, an upstream conveying path 248 extending from the paper trays 20*a* and 20*b* to the upstream clamping unit 244 (indicated by dotted lines in FIG. 2(*a*)), and an upstream conveying unit (not shown) disposed on the upstream conveying path 248 for conveying the paper P. The upstream clamping unit 244 includes an upstream conveying roller 244*a* that is driven to rotate by the conveying motor 242, and an upstream follow roller 244*b*. Together the rollers 244*a* and 244*b* grip the sheets of paper P and convey the sheets in the conveying direction AR. The downstream clamping unit 245 includes a downstream conveying roller 245*a* that is driven to rotate by the conveying motor 242, and a downstream follow roller 245*b*. Together the rollers 245*a* and 245*b* grip the sheets of paper P and convey the sheets in the conveying direction AR.

The main scan mechanism 230 further includes a carriage 233 in which the print head 222 is mounted, and a sliding shaft 234 for retaining the carriage 233 in a manner that allows the carriage 233 to move reciprocally in the main scanning direction (along the Y-axis in FIG. 2). The carriage 233 performs main scans using the drive force of the main scan motor 232 to reciprocate the carriage 233 along the sliding shaft 234.

As shown in FIG. 2(*b*), nozzle rows NC, NM, NY, and NK for ejecting ink in the respective colors cyan, magenta, yellow, and black are formed in the surface of the print head 222 that opposes the platen 40. Each row of nozzles includes a plurality (210 in this example) of nozzles through which ink of the same color is ejected in order to form dots on the paper P. A piezoelectric element (not shown) is provided for each nozzle for driving the respective nozzle to eject ink. As shown in FIG. 2(*b*), the nozzles in each row are aligned in the sub-scanning direction at a nozzle pitch N. Note that it is also possible to arrange the nozzles of each row in a staggered formation, for example, rather than the linear formation shown in FIG. 2(*b*).

Figure 3:
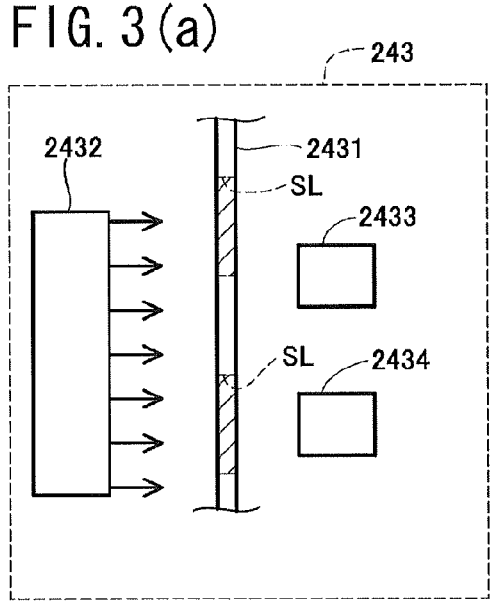
FIG. 3(a) is a explanation diagram illustrating a configuration of a rotary encoder.
FIG. 3(b) is an explanation diagram illustrating a slit disk.
FIG. 3(c) is graphs showing examples of pulse signals outputted by the rotary encoder.
FIG. 3(d) is an explanation diagram illustrating a relation between a conveying distance and a conveying number.
Figure 3:
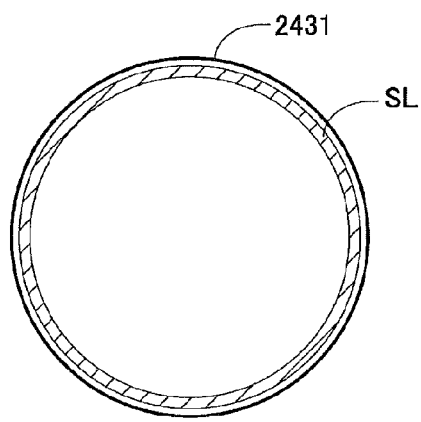
Figure 3:
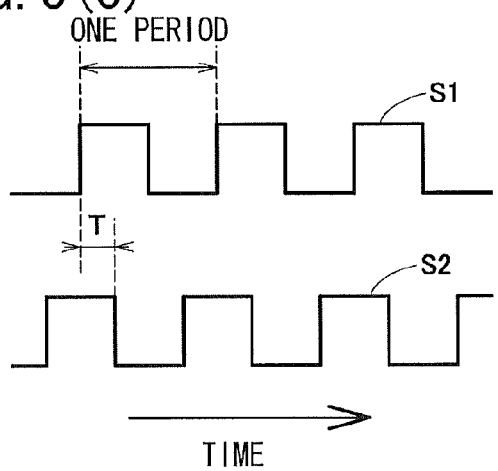
Figure 3:
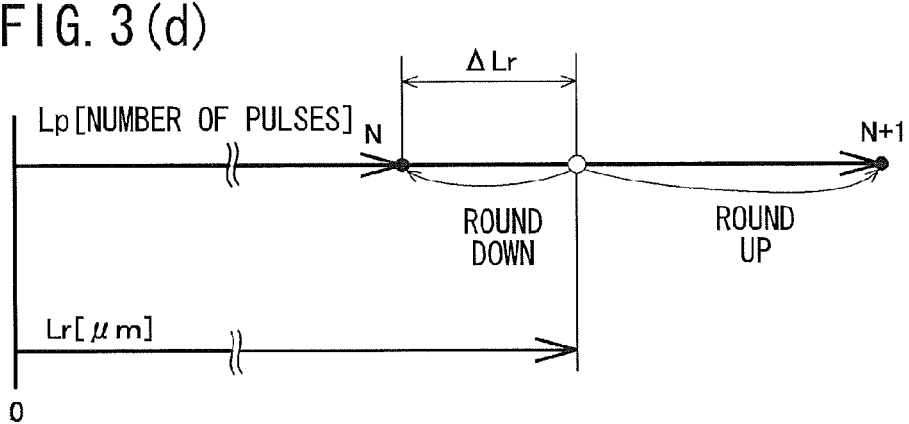

FIGS. 3(*a*)-3(*d*) are an explanatory diagram for illustrating conveyance control. FIGS. 3(*a*)-3(*c*) illustrate an example of the rotary encoder 243 used in conveyance control. As shown in FIG. 3(*a*), the rotary encoder 243 includes a slit disk 2431, a light-emitting element 2432, two light-receiving elements 2433 and 2434, and an output unit (not shown) for processing and outputting signals received from the light-receiving elements 2433 and 2434.

As shown in FIG. 3(*b*), the slit disk 2431 has a disk shape. The slit disk 2431 is fixed coaxially with the rotational axis of the upstream conveying roller 244*a* (see FIG. 2(*a*)) and rotates together with the same. As shown in FIG. 3(*a*), plurality of slits SL is formed in the outer peripheral edge of the slit disk 2431 at regular intervals (a fixed period) around the entire circumference thereof. The slits SL extend in the radial direction of the slit disk 2431. Hatching lines in FIG. 3(*b*) indicating the region in which the slits SL are formed.

The light-emitting element 2432 is fixed to the body of the MFP 200 on one axial side of the slit disk 2431 (see FIG. 3(*a*)). The light-emitting element 2432 includes photodiodes and lenses and functions to irradiate light from one axial side of the slit disk 2431 toward the region in which the slits SL are formed. The light-receiving elements 2433 and 2434 are fixed in positions on the other axial side of the slit disk 2431 and opposing the light-emitting element 2432 through the region in which the slits SL are formed (see FIG. 3(*a*)). The light-receiving elements 2433 and 2434 are offset from each other by a prescribed length such that a ratio of the prescribed length to a length of one slit period corresponds to a phase of 90 degrees. That is, the prescribed length is one-fourth the length corresponding to one slit period.

The light-receiving elements 2433 and 2434 receive light emitted from the light-emitting element 2432 via the slits SL and generate electric signals corresponding to the received light. The output unit, not shown in the drawings, outputs pulse signals based on the electric signals generated by the light-receiving elements 2433 and 2434.

FIG. 3(*c*) shows an example of pulse signals outputted by the rotary encoder 243 when the slit disk 2431, and hence the upstream clamping unit 244, is rotated at a fixed speed. Pulse signals S1 and S2 correspond to electric signals generated by the light-receiving elements 2433 and 2434, respectively. The periods of the pulse signals S1 and S2 correspond to the period of the slits SL formed in the slit disk 2431. The pulse signals S1 and S2 are offset at a 90-degree phase from each other.

The periods of the pulse signals S1 and S2 are equivalent to the time required for the slit disk 2431 to rotate an amount equivalent to the interval between slits.

The pulse signals S1 and S2 are inputted into the conveying motor drive unit 241, and the conveying motor drive unit 241 controls the conveying distance of the paper P by driving the conveying motor 242 while counting the rising edges and falling edges of each signal. As shown in FIG. 3(*c*), the smallest unit T that can be counted by the conveying motor drive unit 241 is equivalent to one-fourth the period of the pulse signals S1 and S2.

The smallest conveying unit is the smallest unit at which the conveying motor drive unit 241 can control the conveying distance and is determined based on the smallest unit T of the pulse signals S1 and S2 that the conveying motor drive unit 241 can count, i.e., the resolution of the rotary encoder 243. For example, the smallest conveying unit is the conveying distance corresponding to the smallest unit T. In the embodiment, the smallest conveying unit is a value of 1 µm or smaller.

The conveyance number instruction unit M24 of the print control unit M20 converts a directed conveying distance Lr expressed one type of units (µm, for example; not limited to an integer, but may include digits to the right of the decimal) to a conveying number Lp expressing the number of the smallest conveying distances in different units (pulses, for example). The directed conveying distance Lr is, for example, an assigned conveying distance Lg set by the conveying distance setting unit M23 in a conveying distance setting process described later in FIG. 8. The conveyance number instruction unit M24 instructs the conveying motor drive unit 241 to drive the conveying motor a desired conveying distance by providing the conveying number Lp to the conveying motor drive unit 241. As shown in FIG. 3(*d*), since the conveying number Lp is an integer, the directed conveying distance Lr cannot be converted precisely into the conveying number Lp, resulting in a fraction ΔLr. Thus, in order to convert the directed conveying distance Lr to the conveying number Lp, the conveyance number instruction unit M24 either rounds up or rounds down. For example, the conveyance number instruction unit M24 may round up when the fraction ΔLr exceeds half of the smallest conveying distance and may round down when the fraction ΔLr is smaller than or equal to half the smallest conveying distance. The conveyance number instruction unit M24 may also store the fraction ΔLr for consideration when determining the next conveying number Lp.

A-2. Printing Methods

Next, the methods of printing supported by the print control unit M20 (FIG. 1) will be described. The print control unit M20 prints by controlling the ink ejection mechanism 220, the main scan mechanism 230, and the conveyance mechanism 240 to execute a unit print and a unit sub scan repeatedly and alternatingly. The "unit print" is a printing operation performed by driving the nozzles of the print head 222 during a main scan while the sheet of paper P is halted on the platen 40. A single main scan corresponding to a single unit print is also called a "pass." The "unit sub scan" is performed by conveying the sheet of paper P in the conveying direction AR a prescribed unit conveying distance L.

The print control unit M20 can perform interlaced printing using two types of printing methods with respect to "four passes" and four types of printing methods with respect to "eight passes". FIGS. 4(a) and 4(b) illustrate four-pass printing methods. FIG. 4(a) illustrates a 4n+1 printing method, while FIG. 4(b) illustrates a 4n−1 printing method. FIGS. 5(a), 5(b), 6(a), and 6(b) illustrate eight-pass printing methods. FIGS. 5(a) and 5(b) illustrate 8n+1 and 8n−1 printing methods, respectively. FIGS. 6(a) and 6(b) illustrate 8n+3 and 8n−3 printing methods, respectively.

With interlaced printing, the MFP 200 can print at a higher resolution in which the line spacing D (that is, dot pitch in the sub-scanning direction) of a plurality of raster lines RL is smaller than the nozzle pitch N of nozzles arranged in the sub-scanning direction. Here, a raster line RL is a line formed by dots DT aligned in the main scanning direction. A printed image is formed by arranging a plurality of raster lines RL in the sub-scanning direction. Each of the raster lines forming the printed image is assigned a sequential raster number RN in order from the upstream side to the downstream side in the sub-scanning direction. In the following description, a raster line RL having raster number j (where j is a natural number) will be given the notation raster line RL(j).

FIGS. 4(a) through 6(b) show the positions of the nozzles relative to the sub-scanning direction for each pass. The number of passes k of a printing method is expressed as <nozzle pitch N>/<line spacing D>. Hence, a four-pass printing method denotes printing at a line spacing D of one-fourth the nozzle pitch N of the nozzles being used, and an eight-pass printing method denotes printing at a line spacing D of one-eighth the nozzle pitch N. In other words, when using an eight-pass printing method, the MFP 200 can print at twice the resolution in the sub-scanning direction than when using a four-pass printing method. Further, the notation "P(m)" is used to identify each pass, where "m" indicates the order in which each pass is executed. The numbers included under dots DT in the drawings for each raster line denote the pass in which a dot DT is formed on the corresponding raster line RL. For example, as shown in FIG. 4(a), dots DT on raster lines RL(1) and RL(5) are formed in pass P(1), while dots DT on raster lines RL(2), RL(6), and RL(10) are formed in pass P(2).

The solid horizontal lines included in each drawing represent the start of the printable area. Thus, raster lines RL cannot be printed on the upstream side of (above, in the drawings) this horizontal line with respect to the sub-scanning direction.

The name given to each printing method is expressed in the form "kn+b," where n is a natural number determined by the number of nozzles being used, k is the number of passes represented by N/D and is a value of 3 or greater, and b is a non-zero integer satisfying the expression $-(\frac{1}{2})k < b < (\frac{1}{2})k$. This notation represents a printing method in which the number of nozzles used is (kn+b) and the unit conveying distance L is D×(k×n+b). For example, the 4n+1 printing method shown in FIG. 4(a) is a four-pass printing method that uses 201 nozzles to print a unit conveying distance L that is 201 times the line spacing D (when n=50). Similarly, the 8n+3 printing method shown in FIG. 6(a) is an eight-pass printing method (hence, the line spacing D is half the line spacing D in a four-pass printing method) that uses 203 nozzles to print a unit conveying distance L that is 203 times the line spacing D (when n=25), for example. In order to avoid needless complexity in the drawings, all examples illustrate a case in which n=1. The unit conveying distance L in these examples is an ideal conveying distance equivalent to the line spacing for all printed raster lines and will be called the "uniform conveying distance L." The line spacing D used in these examples is an ideal line spacing D achieved with the ideal unit conveying distance L and will be called the "ideal line spacing D." Hereinafter, the uniform conveying distances for the 4n+1, 4n−1, 8n+3, 8n−3, 8n+1, and 8n−1 are represented L1, L2, L3, L4, L5, and L6, for distinguishing each other.

The printing methods 4n+1 (FIG. 4(a)) and 4n−1 (FIG. 4(b)) are similar in that they are both four-pass printing methods, but differ in the order in which the raster lines composing the printed image are printed. In other words, the order in which the raster lines are printed is determined by the printing method. Here, a description will be given of a pass P(m) for printing regions of the image, excluding the ends of the image in the sub-scanning direction. In interlaced printing, each pass P(m) prints raster lines both (1) in a partially printed region that has already been printed by some of the raster lines in the previous pass P(m−1) and (2) in a region downstream of the partially printed region in the sub-scanning direction. In the 4n+1 method, each pass P(m) prints raster lines in the partially printed region that are adjacent to the raster lines printed in the previous pass P(m−1) and on the downstream side of the same with respect to the sub-scanning direction. In the 4n−1 method, each pass P(m) prints raster lines in the partially printed region that are adjacent to the raster lines printed in the previous pass P(m−1) and on the upstream side of the same with respect to the sub-scanning direction.

The printing methods 8n+1 (FIG. 5(a)), 8n−1 (FIG. 5(b)), 8n+3 (FIG. 6(a)), and 8n−3 (FIG. 6(b)) are similar in that they are all eight-pass printing methods, but differ in the order for printing the plurality of raster lines composing each printed image. In other words, the order in which the raster lines are printed is determined by the printing method. More specifically, the pass P(m) in the 8n+1 method prints raster lines in the partially printed region that are adjacent to raster lines printed in the previous pass P(m−1) and on the downstream side in the sub-scanning direction. The pass P(m) in the 8n−1 method print raster lines in the partially printed region that are adjacent to raster lines printed in the previous pass P(m−1) and on the upstream side of the same in the sub-scanning direction. The pass P(m) in the 8n+3 method prints raster lines in the partially printed region positioned three lines downstream in the sub-scanning direction of the raster lines printed in the previous pass P(m−1). The pass P(m) in the 8n−3 method print raster lines in the partially printed region positioned three lines upstream in the sub-scanning direction of the raster lines printed in the previous pass P(m−1).

A-3. Printing Process

FIG. 7 is a flowchart illustrating steps in a printing process performed on the MFP 200. The print control unit M20 of the MFP 200 executes this printing process when the MFP 200 receives a print job requiring interlaced printing.

In S110 the printing method selection unit M21 of the print control unit M20 acquires printing conditions. These printing conditions include the number of passes to be performed in interlaced printing (the printing resolution in the sub-scanning direction), the volume of the buffer region 291 that can be used for the printing operation (the available buffer capacity), and any unusable nozzles, for example. The printing method selection unit M21 can acquire the number of passes by referencing a print command included in the print job, for example. Unusable nozzles are those that are clogged by ink, for example, and are incapable of ejecting ink. The unusable nozzles may be identified by identification data indicating the unusable nozzles received through user input on the operating unit 280, for example. Alternatively, sensors may be provided for detecting nozzle clogging in the print head 222 for each nozzle, and the unusable nozzles may be identified based on detection signals from the sensors. Since buffer regions 291 are also allocated for other functional units of the MFP 200 in addition to the inkjet printing unit 250, such as the communication unit 270 and the flatbed scanning unit 260, the available buffer capacity can vary according to the operating status of these other functional units.

In S120 the printing method selection unit M21 sets a suitable printing method based on the printing conditions acquired in S110. Specifically, when unusable nozzles exist, the printing method selection unit M21 determines a maximum operable print head length based on the positions of the unusable nozzles and the available buffer capacity. The "operable print head length" represents the number of nozzles that are available for printing among the plurality of nozzles arranged in the sub-scanning direction for each nozzle row provided for each respective ink color (see FIG. 2(b)). The maximum operable print head length decreases when there exist unusable nozzles and when the available buffer capacity is low.

The printing method selection unit M21 sets a printing method for printing at the largest possible operable print head length based on the maximum operable print head length, since a larger operable print head length increases printing speed. Take, for example, the case in which eight-pass interlaced printing is performed with a maximum operable print head length of 150. In this example, the largest possible operable print head length for each of the four printing methods 8n−3, 8n−1, 8n+1, and 8n+3 are 149 (n=19), 143 (n=18), 145 (n=18), and 147 (N=18), respectively. Accordingly, the printing method selection unit M21 sets the printing method to the 8n−3 method (n=19) in this case.

In S130 the conveying distance setting unit M23 of the print control unit M20 determines whether the selected printing method is a four-pass or an eight-pass method. When the printing method is a four-pass method, in S140 the conveying distance setting unit M23 performs a process to set a four-pass conveying distance. If the printing method is an eight-pass method, in S150 the conveying distance setting unit M23 performs a process to set an eight-pass conveying distance. These conveying distance setting processes function to set the unit conveying distance that will be used in each printing process. The unit conveying distance set in S140 or S150 will be called the assigned conveying distance Lg to distinguish it from the uniform conveying distance, since the two values may differ.

Each of FIGS. 8(a) and 8(b) is a flowchart illustrating steps in the conveying distance setting process. FIG. 8(a) describes the four-pass conveying distance setting process, while FIG. 8(b) describes the eight-pass conveying distance setting process. First, the four-pass conveying distance setting process in FIG. 8(a) will be described.

In S1410 the conveying distance setting unit M23 determines whether a white streak suppression mode has been selected. The white streak suppression mode may be selected based on a printing mode specified by the user on the operating unit 280. Alternatively, a command may be included in the print job indicating whether the white streak suppression mode should be used.

If the conveying distance setting unit M23 determines that the white streak suppression mode has not been selected (S1410: NO), in S1420 the conveying distance setting unit M23 references the configuration data 293 (see FIG. 1), sets the assigned conveying distance Lg to the uniform conveying distance corresponding to the four-pass printing method (either L1 or L2, as indicated in first configuration data of FIG. 1), and subsequently ends the conveying distance setting process. On the other hand, if the conveying distance setting unit M23 determines that the white streak suppression mode has been selected (S1410: YES), in S1430 the conveying distance setting unit M23 determines whether the printing method set in S120 of FIG. 7 is the 4n+1 or the 4n−1 method. The conveying distance setting unit M23 references the configuration data 293 (see FIG. 1) based on this printing method and sets the assigned conveying distance Lg to a biased conveying distance obtained by shifting the uniform conveying distance the prescribed shift amount associated with the printing method. For example, when the printing method is 4n+1, in S1440 the conveying distance setting unit M23 sets the biased conveying distance by adding the shift amount $\Delta d$ ($\Delta d>0$) to the uniform conveying distance L1 corresponding to the 4n+1 method. When the printing method is the 4n−1 method, in S1450 the conveying distance setting unit M23 sets the biased conveying distance by subtracting the shift amount $\Delta d$ from the uniform conveying distance L2 corresponding to the 4n−1 method. In the embodiment, the value of $\Delta d$ is 1 μm.

Next, the eight-pass conveying distance setting process will be described. As shown in FIG. 8(b), in S1510 the conveying distance setting unit M23 determines whether the white streak suppression mode has been selected. If the white streak suppression mode has not been selected (S1510: NO), in S1520 the conveying distance setting unit M23 references the configuration data 293 and sets the assigned conveying distance Lg to the uniform conveying distance associated with the eight-pass printing method (one of the uniform conveying distances L3-L6 shown in first configuration data of FIG. 1), and subsequently ends the eight-pass conveying distance setting process. However, if the white streak suppression mode has been selected (S1510: YES), in S1530 the conveying distance setting unit M23 determines whether the printing method set in S120 of FIG. 7 is the 8n−1, 8n+1, 8n−3, or 8n+3 method. The conveying distance setting unit M23 sets the assigned conveying distance Lg to the biased conveying distance obtained by shifting the uniform conveying distance a prescribed shift amount associated with the printing method in the configuration data 293. For example, when the printing method is the 8n+3 method, in S1540 the conveying distance setting unit M23 sets the biased conveying distance by adding the shift amount $\Delta e$ ($\Delta e>0$) to the uniform conveying distance L3. When the printing method is the 8n−3 method, in S1550 the conveying distance setting unit M23 sets the biased conveying distance by subtracting the shift amount $\Delta e$ from the uniform conveying distance L4. When the printing method is the 8n+1 method, in S1560 the conveying distance setting unit M23 sets the biased conveying distance by adding the shift amount 2×Δe to the uniform conveying distance L5. When the printing method is the 8n−1 method, in S1570 the conveying distance setting unit M23 sets the biased conveying distance by subtracting the shift amount 2×Δe from the uniform conveying distance L6. In the embodiment, the value of Δe is 1 μm.

After completing the conveying distance setting process of S150 or S140, in S160 of FIG. 7 the print control unit M20 executes a printing operation according to the printing method set in S120 and using the assigned conveying distance Lg set in the conveying distance setting process. More specifically, the conveying distance setting unit M23 sets the directed conveying distance Lr described earlier to the assigned conveying distance Lg set in the conveying distance setting process and provides the directed conveying distance Lr to the conveyance number instruction unit M24. As described with reference to FIG. 3, the conveyance number instruction unit M24 converts the assigned directed conveying distance Lr (that is, the assigned conveying distance Lg) to a conveyance number and transmits this conveyance number to the conveying motor drive unit 241. The conveying motor drive unit 241 executes a sub scan (conveys the paper) in the printing operation based on the specified conveyance number. Once the printing operation is completed, the printing process ends.

Figure 9A:
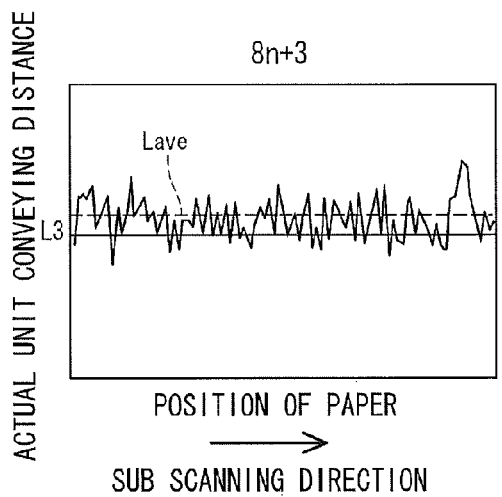
FIGS. 9(a)-9(d) are graphs showing an actual unit conveying distance when using a biased conveying distance as an assigned conveying distance, where
Figure 9B:
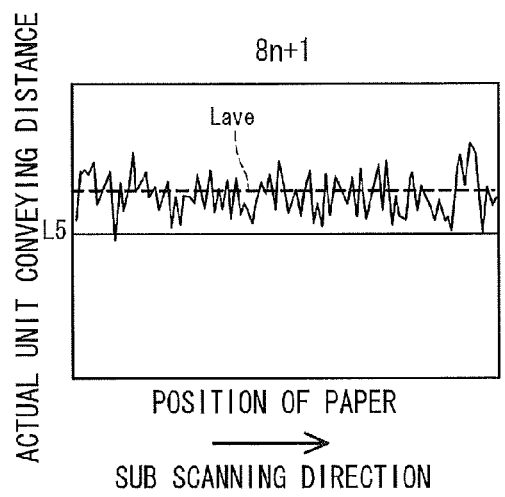
Figure 9C:
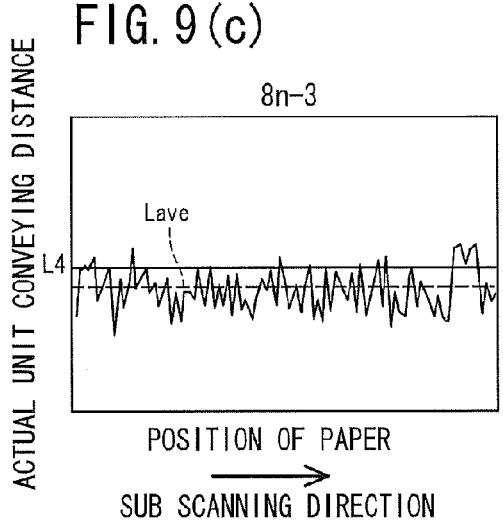
Figure 9D:
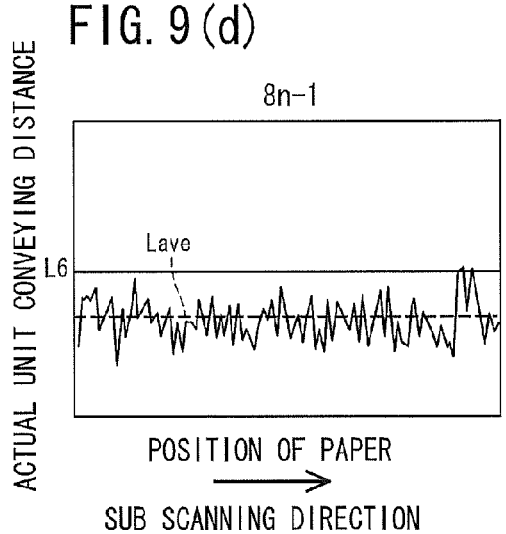

FIGS. 9(a)-9(c) are graphs showing the actual unit conveying distance when using a biased conveying distance as the assigned conveying distance Lg. FIGS. 9(a)-9(d) illustrate actual unit conveying distances for printing operations using the respective methods 8n+3, 8n+1, 8n−3, and 8n−1.

As shown in FIG. 9(a), since the assigned conveying distance Lg used in the 8n+3 method is greatly shifted from the uniform conveying distance L3 corresponding to the 8n+3 method, an average actual unit conveying distance Lave is greater than the uniform conveying distance L3. While there may be some variation in the actual unit conveying distances that produces a negative conveying distance error ΔL relative to the uniform conveying distance L3, the rate of occurrence is lower than when the uniform conveying distance L3 is used as the assigned conveying distance Lg. Further, the magnitude (absolute value) of the conveying distance error ΔL when a negative conveying distance error ΔL occurs is smaller than when the uniform conveying distance L3 is used as the assigned conveying distance Lg (see FIG. 9(a)).

The 8n+1 method uses an assigned conveying distance Lg that is greatly shifted from the uniform conveying distance L5 corresponding to the 8n+1 method. The absolute value of the shift amount is two times larger than the absolute value of the shift amount for the 8n+3 method. Accordingly, the average actual unit conveying distance Lave is much greater than the uniform conveying distance L5. This eliminates almost all occurrence of negative conveying distance error ΔL in the actual unit conveying distance relative to the uniform conveying distance L5 due to variation. Further, the magnitude (absolute value) of any negative conveying distance error ΔL that might occur is even smaller (see FIG. 9(b)).

Since the assigned conveying distance Lg used in the 8n−3 method is slightly shifted from the uniform conveying distance L4 corresponding to the 8n−3 method, the average actual unit conveying distance Lave is smaller than the uniform conveying distance L4. While there may be some variation in the actual unit conveying distances that produces a positive conveying distance error ΔL relative to the uniform conveying distance L4, the rate of occurrence is smaller than when the uniform conveying distance L4 is used as the assigned conveying distance Lg. Further, the magnitude (absolute value) of the positive conveying distance error ΔL when such error occurs is smaller than when the uniform conveying distance L4 is used as the assigned conveying distance Lg (see FIG. 9(c)).

The 8n−1 method uses an assigned conveying distance Lg that is greatly shifted from the uniform conveying distance L6 corresponding to the 8n−1 method. The absolute value of the shift amount is two times larger than the absolute value of the shift amount for the 8n−3 method. Accordingly, the average actual unit conveying distance Lave is much smaller than the uniform conveying distance L6. This eliminates almost all occurrence of positive conveying distance error ΔL in the actual unit conveying distance relative to the uniform conveying distance L6 due to variation. Further, the magnitude (absolute value) of any positive conveying distance error ΔL that might occur is even smaller (see FIG. 9(d)).

The reasoning behind using a biased conveying distance as the assigned conveying distance Lg in the white streak suppression mode, where the biased conveying distance is obtained by shifting the uniform conveying distance a prescribed shift amount based on the printing method, will be described next.

A-4. White Streaks Caused by Conveyance Error in the Printing Methods

In the following description, PN(s) denotes the number of the pass for printing a raster line RL(s), where "s" stands for the raster number RN described above (see FIGS. 4(a)-6(b)), and PN(s+1) denotes the number of the pass for printing the raster line RL(S+1), which is adjacent to and downstream of the raster line RL(s) in the sub-scanning direction. A pass number difference ΔPN(s) denoting the difference between the two raster lines RL(s) and RL(s+1) is defined as ΔPN(s)=PN(s+1)−PN(s). ΔPN(s) is a non-zero integer. "ΔPN(s)=2" indicates that raster line RL(s+1) is printed in the second pass after the pass for printing raster line RL(s). "ΔPN(s)=−2" indicates that raster line RL(s+1) is printed two passes prior to the pass for printing the raster line RL(s).

The pass number difference ΔPN(s) is an index value for evaluating the line spacing error ΔD(s) between the two raster lines RL(s) and RL(s+1). Because the error ΔL occurs, the actual unit conveying distance is not equal to the uniform conveying distance. The line spacing error ΔD(s) can vary due to the error ΔL in the actual unit conveying distance relative to the uniform conveying distance. As the line spacing error ΔD(s) increases, the actual line spacing grows wider than the ideal line spacing D, increasing the likelihood of white streaks being produced. When the actual unit conveying distance is greater than the uniform conveying distance L by an error ΔL, the line spacing error ΔD(s) can be expressed in the following equation (1).

$$\Delta D(s) = \Delta PN(s) \times \Delta L \quad (1)$$

Equation (1) signifies that the line spacing error ΔD(s) can be expressed by accumulating the conveying distance error ΔL a number of times equivalent to the absolute value of the pass number difference ΔPN(s). Hence, the absolute value of the line spacing error ΔD(s) increases as the absolute value of the pass number difference ΔPN(s) increases. Further, if the pass number difference ΔPN(s) is positive and the conveying distance error ΔL is positive, the actual line spacing will be greater than the line spacing D. Similarly, if the pass number difference ΔPN(s) is negative and the conveying distance error ΔL is negative, the actual line spacing will be greater than the line spacing D. Therefore, when the conveying distance error ΔL is positive (i.e., when the actual unit conveying distance is greater than the uniform conveying distance L) and when the pass number difference ΔPN(s) is positive, the potential for white streaks being produced between two raster lines corresponding to the pass number difference ΔPN(s) increases as the absolute value of pass number difference ΔPN(s) increases. When the conveying distance error ΔL is negative (i.e., when the actual unit conveying distance is smaller than the uniform unit conveying distance L), and when the pass number difference ΔPN(s) is negative, the potential for white streaks being produced between two raster lines corresponding to the pass number difference ΔPN(s) increases as the absolute value of the pass number difference ΔPN(s) increases.

Here, the pass number difference having the largest absolute value among the pass number differences ΔPN(s) for all pairs of adjacent raster lines in the printer image will be called the maximum pass number difference. Further, the pass number difference having the largest absolute value among all positive pass number differences ΔPN(s) will be called the maximum positive pass number difference and the pass number difference having the largest absolute value among all negative pass number differences ΔPN(s) will be called the maximum negative pass number difference.

The following points can be understood from the above description.

1. Printing methods whose absolute value of the maximum positive pass number difference is smaller than the absolute value of the maximum negative pass number difference are less likely to produce white streaks when the conveying distance error ΔL is positive than when the conveying distance error ΔL is negative.

2. Printing methods whose absolute value of the maximum negative pass number difference is smaller than the absolute value of the maximum positive pass number difference are less likely to produce white streaks when the conveying distance error ΔL is negative than when the conveying distance error ΔL is positive.

3. When the conveying distance error ΔL is positive, white streaks are less likely to be produced in printing methods having a smaller absolute value of the maximum positive pass number difference.

4. When the conveying distance error ΔL is negative, white streaks are less likely to be produced in printing methods having a smaller absolute value of the maximum negative pass number difference.

Based on the above points, the two four-pass printing methods shown in FIGS. 4(a) and 4(b) will be considered. For the 4n+1 printing method (FIG. 4(a)), the pass number difference ΔPN(s) takes on one of the values "−3" or "1". For example, the pass number difference ΔPN(4) between raster lines RL(4) and RL(5) is "−3" (indicated by the dotted line c1 in FIG. 4(a)). The pass number difference ΔPN(2) between raster lines RL(2) and RL(3) is "1" (indicated by the dotted line c2 in FIG. 4(a)). Hence, the maximum pass number difference and the maximum negative pass number difference for the 4n+1 printing method are both "−3", while the maximum positive pass number difference is "1".

In the 4n+1 method, the absolute value of the maximum positive pass number difference is smaller than the absolute value of the maximum negative pass number difference. Therefore, the 4n+1 method is less likely to produce white streaks when the conveying distance error ΔL is positive than when the conveying distance error ΔL is negative. Hence, it is preferable to reduce the potential for the occurrence of a negative conveying distance error ΔL in the actual conveying distance relative to the uniform conveying distance L1 and to suppress the magnitude of negative conveying distance error ΔL, by presetting, as an target value, an assigned conveying distance Lg shifted in the positive direction from the uniform conveying distance L1 for the 4n+1 method. In this way, it is possible to reduce the potential for white streaks occurring when printing with the 4n+1 method.

For the 4n−1 printing method (FIG. 4(b)), the pass number difference ΔPN(s) takes on one of the values "3" or "4". For example, the pass number difference ΔPN(3) between raster lines RL(3) and RL(4) is "3" (indicated by the dotted line c1 in FIG. 4(b)). The pass number difference ΔPN(4) between raster lines RL(4) and RL(5) is "−1" (indicated by the dotted line c2 in FIG. 4(b)). Hence, the maximum pass number difference and the maximum positive pass number difference for the 4n−1 printing method are both "3", while the maximum negative pass number difference is "4".

In the 4n−1 method, the absolute value of the maximum negative pass number difference is smaller than the absolute value of the maximum positive pass number difference. Therefore, the 4n−1 method is less likely to produce white streaks when the conveying distance error ΔL is negative than when the conveying distance error ΔL is positive. Hence, it is preferable to reduce the potential for the occurrence of a positive conveying distance error ΔL in the actual conveying distance relative to the uniform conveying distance L2 and to suppress the magnitude of positive conveying distance error ΔL, by presetting, as a target value, an assigned conveying distance Lg shifted in the negative direction from the uniform conveying distance L2 for the 4n−1 method. In this way, it is possible to reduce the potential for white streaks occurring when printing with the 4n−1 method.

Next, the four eight-pass printing methods shown in FIGS. 5(a)-6(b) will be considered. For the 8n+1 method (FIG. 5(a)), the pass number difference ΔPN(s) takes on one of the values "−7" or "1". For example, the pass number difference ΔPN(8) between raster lines RL(8) and RL(9) is "−7" (indicated by the dotted line c1 in FIG. 5(a)). The pass number difference ΔPN(10) between raster lines RL(10) and RL(11) is "1" (indicated by the dotted line c2 in FIG. 5(a)). Hence, the maximum pass number difference and the maximum negative pass number difference for the 8n+1 printing method are both "−7", while the maximum positive pass number difference is "1".

For the 8n−1 method (FIG. 5(b)), the pass number difference ΔPN(s) takes on one of the values "7" or "−1". For example, the pass number difference ΔPN(7) between raster lines RL(7) and RL(8) is "7" (indicated by the dotted line c1 in FIG. 5(b)). The pass number difference ΔPN(10) between raster lines RL(10) and RL(11) is "−1" (indicated by the dotted line c2 in FIG. 5(b)). Hence, the maximum pass number difference and the maximum positive pass number difference for the 8n−1 printing method are both "7", while the maximum negative pass number difference is "−1".

For the 8n+3 method (FIG. 6(a)), the pass number difference ΔPN(s) takes on one of the values "−5" or "3". For example, the pass number difference ΔPN(2) between raster lines RL(2) and RL(3) is "−5" (indicated by the dotted line c1 in FIG. 6(a)). The pass number difference ΔPN(4) between raster lines RL(4) and RL(5) is "3" (indicated by the dotted line c2 in FIG. 6(a)). Hence, the maximum pass number difference and the maximum negative pass number difference for the 8n+3 printing method are both "−5", while the maximum positive pass number difference is "3".

For the 8n−3 method (FIG. 6(b)), the pass number difference ΔPN(s) takes on one of the values "5" or "−3". For example, the pass number difference ΔPN(5) between raster lines RL(5) and RL(6) is "5" (indicated by the dotted line c1 in FIG. 6(b)). The pass number difference ΔPN(6) between raster lines RL(6) and RL(7) is "−3" (indicated by the dotted line c2 in FIG. 6(b)). Hence, the maximum pass number difference and the maximum positive pass number difference for the 8n−3 printing method are both "5", while the maximum negative pass number difference is "−3".

In the 8n+1 and 8n+3 methods, the absolute value of the maximum positive pass number difference is smaller than the absolute value of the maximum negative pass number difference. Therefore, the 8n+1 and 8n+3 methods are less likely to produce white streaks when the conveying distance error ΔL is positive than when the conveying distance error ΔL is negative. Hence, it is preferable to reduce the potential for the occurrence of a negative conveying distance error ΔL in the actual conveying distance relative to the uniform conveying distance L5 and L3, respectively, and to suppress the magnitude of negative conveying distance error ΔL, by presetting, as a target value, an assigned conveying distance Lg shifted in the positive direction from the uniform conveying distance L5 and L3 for the 8n+1 and 8n+3 methods, respectively. In this way, it is possible to reduce the potential for white streaks occurring when printing with the 8n+1 and 8n+3 methods.

In the 8n−1 and 8n−3 methods, the absolute value of the maximum negative pass number difference is smaller than the absolute value of the maximum positive pass number difference. Therefore, the 8n−1 and 8n−3 methods are less likely to produce white streaks when the conveying distance error ΔL is negative than when the conveying distance error ΔL is positive. Hence, it is preferable to reduce the potential for the occurrence of a positive conveying distance error ΔL in the actual conveying distance relative to the uniform conveying distance L6 and L4, respectively, and to suppress the magnitude of positive conveying distance error ΔL, by presetting, as a target value, an assigned conveying distance Lg shifted in the negative direction from the uniform conveying distance L6 and L4 for the 8n−1 and 8n−3 methods, respectively. In this way, it is possible to reduce the potential for white streaks occurring when printing with the 8n−1 and 8n−3 methods.

The printing methods can be arranged in order based on the absolute values of their maximum positive pass number differences from smallest to largest, as follows: 8n+1<8n+3<8n−3<8n−1. Consequently, the order of these methods beginning from the method least likely to produce white streaks for a positive conveying distance error ΔL is 8n+1, 8n+3, 8n−3, and 8n−1.

Similarly, the printing methods can be arranged in order based on the absolute values of their maximum negative pass number differences from smallest to largest, as follows: 8n−1<8n−3<8n+3<8n+1. Consequently, the order of these methods beginning from the method least likely to produce white streaks for a negative conveying distance error ΔL is 8n−1, 8n−3, 8n+3, and 8n+1.

Hence, compared to the 8n−3 method, the 8n−1 method is more likely to produce white streaks when the conveying distance error ΔL is positive and less likely when the conveying distance error ΔL is negative. Therefore, the shift amount for shifting the conveying distance in the negative direction from the uniform conveying distance L6 in the 8n−1 method is preferably larger than that set in the 8n−3 method. This configuration can more effectively reduce the potential for white streaks occurring when printing with the 8n−3 method.

Further, compared to the 8n+3 method, the 8n+1 method is more likely to produce white streaks when the conveying distance error ΔL is negative and less likely when the conveying distance error ΔL is positive. Therefore, the shift amount for shifting the conveying distance in the positive direction from the uniform conveying distance L5 in the 8n+1 method is preferably larger than that set in the 8n+3 method. This configuration can more effectively reduce the potential for white streaks occurring when printing with the 8n+3 method.

FIG. 10 is a graph showing the results of simulating the maximum line spacing values in printing operations performed using each of the eight-pass printing methods. In this simulation, variation in the maximum line spacing was calculated for cases in which the actual unit conveying distance diverged from the uniform conveying distance in each printing method. In FIG. 10, the uniform unit conveying distance for all printing methods have been aligned at the same position on the horizontal axis (indicated by L in FIG. 10), and changes in the maximum line spacing values are plotted according to deviations from this position. White streaks become more likely to occur as the maximum line spacing increases and less likely to occur as the maximum line spacing decreases. In this simulation, the relationship among the eight-pass printing methods based on their maximum line spacing within the region in which the actual unit conveying distance is greater than the uniform conveying distance (the region in which the conveying distance error ΔL is positive) is 8n−1>8n−3>8n+3>8n+1. The relationship among the eight-pass printing methods based on their maximum line spacing is the opposite within the region in which the actual unit conveying distance is smaller than the uniform conveying distance (the region in which the conveying distance error ΔL is negative): 8n−1<8n−3<8n+3<8n+1. In other words, the simulation supports the above description.

When performing interlaced printing, the MFP 200 according to the embodiments described above sets the assigned conveying distance Lg to a biased conveying distance found by increasing or decreasing the uniform conveying distance of the printing method based on the type of printing method being used. Accordingly, the MFP 200 can reduce the occurrence of white streaks caused by error in the conveying distance and can reduce defects in the quality of the printed image based on the printing method being used.

Further, in the 8n+1, 8n+3, and 4n+1 printing methods, the MFP 200 set the assigned conveying distance Lg to a biased conveying distance greater than the uniform conveying distance set for the respective printing method. In the 8n−1, 8n−3, and 4n−1 printing methods, on the other hand, the MFP 200 sets the assigned conveying distance Lg to a biased conveying distance smaller than the uniform conveying distance set for the respective printing method. As a result, the MFP 200 can set suitable biased conveying distances for suppressing the occurrence of white streaks suited to the type of printing method, thereby more effectively suppressing the occurrence of white streaks.

Further, the absolute value of the shift amount from the uniform conveying distance is set greater for the 8n+1 and 8n−1 methods than the 8n+3 and 8n−3 methods. In other words, the difference between the assigned conveying distance Lg and the uniform conveying distance is set larger in the 8n+1 and 8n−1 methods than in the 8n+3 and 8n−3 methods. As a result, the MFP 200 can set a suitable biased conveying distance with sufficient difference from the uniform conveying distance to suppress white streaks, thereby more effectively suppressing the occurrence of white streaks.

Further, since the MFP 200 of the embodiments is provided with the printing method selection unit M21 and the conveyance number instruction unit M24, the MFP 200 can set suitable conveying distances for each available printing method capable of reducing the potential for a decline in image quality when the MFP 200 is capable of executing a plurality of types of printing methods.

B. Variations of the Embodiment

While the invention has been described in detail with reference to the embodiment thereof, it would be apparent to those skilled in the art that various changes and modifications may be made therein without departing from the scope of the invention.

(1) In the embodiment described above, when the assigned conveying distance Lg is set to a biased conveying distance, the conveying distance setting unit M23 provides this biased conveying distance to the conveyance number instruction unit M24 as the directed conveying distance Lr. The conveyance number instruction unit M24 then converts the biased conveying distance to the conveying number Lp and provides the conveying number Lp to the conveying motor drive unit 241, and the conveying motor drive unit 241 executes a sub scan based on the biased conveying distance. However, as a variation of this method, when the assigned conveying distance Lg is set to a biased conveying distance, the conveying distance setting unit M23 notifies, to the conveyance number instruction unit M24, information about whether the biased conveying distance is greater than or less than the uniform conveying distance. Although the conveyance number instruction unit M24 uses the uniform conveying distance as the directed conveying distance Lr in this case, the conveyance number instruction unit M24 rounds up or rounds down fractions when converting the directed conveying distance Lr to the conveying number Lp in order to implement sub scans at a biased conveying distance.

Specifically, the conveyance number instruction unit M24 implements a sub scan at a biased conveying distance that is larger than the uniform conveying distance by always rounding up the conveying number Lp when converting the uniform conveying distance to the conveying number Lp, regardless of the magnitude of the fraction ΔLr. The conveyance number instruction unit M24 implements a sub scan at a smaller biased conveying distance than the uniform conveying distance by always rounding down the conveying number Lp when converting the uniform conveying distance to the conveying number Lp, regardless of the magnitude of the fraction ΔLr.

This variation can control smaller differences between the uniform conveying distance and the biased conveying distance than the smallest conveying distance determined based on the resolution of the rotary encoder 243, thereby controlling the biased conveying distance with greater precision. The variation may be applied to such cases as when the smallest conveying distance is greater than the shift amounts Δd and Δe described in the embodiments.

(2) In the embodiment described above, a biased conveying distance is used as the assigned conveying distance Lg when the white streak suppression mode has been selected, and the uniform conveying distance is used as the assigned conveying distance Lg when the white streak suppression mode has not been selected. However, the biased conveying distance may always be used as the assigned conveying distance Lg instead. In this case, the configuration data includes second configuration data for correlating printing methods with conveying distances as shown in FIG. 1, the second configuration data may be configured such that only biased conveying distances are associated with the printing methods. In this variation, steps S1410 and S1420 of FIG. 8(a) and S1510 and S1520 of FIG. 8(b), which are circumscribed by dotted lines in the drawings, may be omitted from the respective conveying distance setting processes.

(3) The MFP 200 in the embodiment described above may also be configured as a standalone printing device. Further, the inkjet printing unit 250 may be a printing device that does not perform main scans, known as a line printer. Further, the conveyance mechanism 240 of the inkjet printing unit 250 may be configured to move the print head over the paper in the sub-scanning direction while the paper remains fixed in position.

(4) The six types of printing methods described in the embodiment are all examples of interlaced printing methods, but various other types of printing methods may be employed. In such cases, a suitable printing method can be selected by evaluating the relationship between sub-scanning properties produced in each printing method and the generation of white streaks using the technique described in the embodiment. For example, when employing a plurality of types of printing methods that use uniform conveyance in which the uniform conveying distance is expressed by D×(k×n+b) (where D is the ideal line spacing, n is a natural number set based on the number of nozzles being used, k is the number of passes represented by N/D and is 3 or greater, and b is a non-zero integer that satisfies the expression $-(\frac{1}{2})k<b<(\frac{1}{2})k$), the biased conveying distance is set larger than the uniform conveying distance when a value of b is positive, whereas the biased conveying distance is set smaller than the uniform when a value of b is negative. In this case, the greater an absolute value of b is, the smaller an absolute value of difference between the uniform conveying distance and the biased conveying distance may be set. Further, the smaller an absolute value of b is, the greater an absolute value of difference between the uniform conveying distance and the biased conveying distance may be set.

(5) The MFP 200 of the embodiment described above can employ a plurality of printing methods, but the invention may be applied to a printing device capable of using only one printing method. In this case, a suitable biased conveying distance will be set for the single printing method.

(6) The shift amounts Δd and Δe in the biased conveying distances described above may be set to various values and are not limited to 1 μm. Suitable values may be determined with consideration for dot size, ideal line spacing D, and the like after performing simulations and actual printing operations while varying the conveying distance, for example.

(7) The invention may be applied to a method of setting conveying distances for the MFP 200 during the manufacturing stage, for example. In this case, the conveying distance setting process of FIG. 8 (excluding steps circumscribed by dotted lines) may be executed with a computer other than that provided in the MFP 200, and the biased conveying distances determined through this process may be configured in the MFP 200.

(8) Part of the configuration of the invention implemented in hardware in the embodiment described above may be replaced by software and, conversely, part of the configuration of the invention implemented in software may be replaced by hardware.

What is claimed is:

1. A printing device comprising:
   a print head including a plurality of nozzles arranged in a first direction and spaced apart by a prescribed nozzle pitch, the plurality of nozzles being configured to form dots having a same color on a recording sheet;
   a scanning portion configured to perform a scan in which the scanning portion moves the print head relative to the recording sheet in the first direction;
   a head drive portion configured to drive at least one nozzle of the plurality of nozzles to form dots such that a raster line configured of the dots extends in a second direction different from the first direction; and
   a print control processor configured to perform a print operation in a resolution in which a plurality of raster lines is arranged in the first direction by a line pitch smaller than the prescribed nozzle pitch by using a prescribed print method and by controlling the print head, the scanning portion, and the head drive portion, the prescribed print method printing the plurality of raster lines arranged in the first direction in a prescribed order, wherein the print control processor is configured to control the scanning portion to convey the recording sheet by a biased conveying distance as a target conveying distance, wherein the biased conveying distance is set, depending on the prescribed print method, to be decreased or increased from a prescribed distance, the prescribed distance being an ideal value that achieves the resolution in which the plurality of raster lines is uniformly arranged in the first direction by the line pitch, wherein the prescribed print method defines the prescribed distance by $D \times (k \times n + b)$, where D represents the line pitch, n represents a natural number set based on number of the at least one nozzle being used, k is a number given by N/D and is 3 or greater wherein N indicates the prescribed nozzle pitch, and b is a non-zero integer satisfying $-(½)k \leq b \leq (½)k$, wherein the biased conveying distance is set to be increased from the prescribed distance when a value of b is positive, whereas the biased conveying distance is set to be decreased from the prescribed distance when the value of b is negative.

2. The printing device according to claim 1, wherein the larger an absolute value of b is, the smaller an absolute value of a difference between the biased conveying distance and the prescribed distance.

3. The printing device according to claim 1, wherein the scanning portion includes:
 a motor configured to supply a force to be used in the scan;
 an encoder configured to detect a conveying distance of the scan in an encoding resolution; and
 a motor driving unit configured to drive the motor such that the recording sheet is conveyed a smallest conveying distance as a unit distance, the smallest conveying distance being determined by the encoding resolution,
 wherein the print control processor is configured to function as a number instruction unit configured to transmit a conveyance number that is an integer and indicates number of the unit distance,
 wherein the number instruction unit is configured to set the biased conveying distance decreased from the prescribed distance by converting the prescribed distance to the conveyance number by rounding down fractions, whereas the number instruction unit is configured to set the biased conveying distance increased from the prescribed distance by converting the prescribed distance to the conveyance number by rounding up fractions.

4. The printing device according to claim 1, wherein the print control processor is configured to perform a plurality of print methods, each of the plurality of print methods printing the plurality of raster lines arranged in the first direction in a prescribed order, the prescribed order being specific to each of the plurality of print methods,
 wherein the print control processor is configured to function as:
 a selecting unit configured to select one of the plurality of print methods as the prescribed print method; and
 a conveying distance setting unit configured to set the biased conveying distance based on the selected one of the plurality of print methods.

5. A method for setting a printing device including: a print head including a plurality of nozzles arranged in a first direction and spaced apart by a prescribed nozzle pitch, and configured to form dots having a same color on a recording sheet; a scanning portion configured to perform a scan in which the scanning portion moves the print head relative to the recording sheet in the first direction; and a head drive portion configured to drive at least one nozzle of the plurality of nozzles to form dots such that a raster line configured of the dots extends in a second direction different from the first direction,
 the method comprising:
 (a) determining a print method by which a plurality of raster lines is to be printed and arranged in the first direction in a prescribed order by a line pitch smaller than the prescribed nozzle pitch and to achieve a prescribed resolution, by using the print head, the scanning portion, and the head drive portion; and
 (b) setting, depending on the print method, a biased conveying distance such that the biased conveying distance decreases or increases from a prescribed distance, the prescribed distance being an ideal value that achieves the prescribed resolution in which the plurality of raster lines is uniformly arranged in the first direction by the nozzle pitch, the biased conveying distance being used as a target conveying distance in the print method,
 wherein the print method defines the prescribed distance by $D \times k \times n + b)$, where D represents the line pitch, n represents a natural number set based on number of the at least one nozzle being used, k is a number given by N/D and is 3 or greater wherein N indicates the prescribed nozzle pitch, and b is a non-zero integer satisfying $-(½)k \leq b \leq (½)$
 wherein the biased conveying distance is set to be increased from the prescribed distance when a value of b is positive, whereas the biased conveying distance is set to be decreased from the prescribed distance when the value of b is negative.

6. A non-transitory computer readable storage medium storing a set of program instructions executed by a computer for controlling a printing device including:
 a print head including a plurality of nozzles arranged in a first direction and spaced apart by a prescribed nozzle pitch, and configured to form dots having a same color on a recording sheet; a scanning portion configured to perform a scan in which the scanning portion moves the print head relative to the recording sheet in the first direction; and a head drive portion configured to drive at least one nozzle of the plurality of nozzles to form dots such that a raster line configured of the dots extends in a second direction different from the first direction,
 the program instructions comprising:
 (a) determining a print method by which a plurality of raster lines is to be printed and arranged in the first direction in a prescribed order by a line pitch smaller than the prescribed nozzle pitch and achieves a prescribed resolution, by using the print head, the scanning portion, and the head drive portion; and
 (b) setting, depending on the print method, a biased conveying distance used in the print method such that the biased conveying distance decreases or increases from a prescribed distance, the prescribed distance being an ideal value that achieves the prescribed resolution in which the plurality of raster lines is uniformly arranged in the first direction by the nozzle pitch, the biased conveying distance being used as a target conveying distance in the print method,
 wherein the print method defines the prescribed distance by $D \times (k \times n + b)$, where D represents the line pitch, n represents a natural number set based on number of the at least one nozzle being used, k is a number given by N/D and is 3 or greater wherein N indicates the prescribed nozzle pitch, and b is a non-zero integer satisfying $-(½)k \leq b \leq (½)$ wherein the biased conveying distance is set to be increased from the prescribed distance when a value of b is positive, whereas the biased conveying distance is set to be decreased from the prescribed distance when the value of b is negative.

\* \* \* \* \*